Oct. 28, 1969 D. M. HARVEY 3,475,092

WIRELESS REMOTE CONTROL SLIDE CHANGER

Filed Oct. 23, 1967 2 Sheets-Sheet 1

DONALD M. HARVEY
INVENTOR

BY Gary D. Fields
Robert W Hampton
ATTORNEYS

WIRELESS REMOTE CONTROL SLIDE CHANGER

Filed Oct. 23, 1967 2 Sheets-Sheet 2

DONALD M. HARVEY
INVENTOR
BY Gary D. Fields
Robert W. Hampton
ATTORNEYS

United States Patent Office 3,475,092
Patented Oct. 28, 1969

3,475,092

WIRELESS REMOTE CONTROL SLIDE CHANGER

Donald M. Harvey, Rochester, N.Y., assignor to Eastman Kodak Company, Rochester, N.Y., a corporation of New Jersey Filed Oct. 23, 1967, Ser. No. 677,317
Int. Cl. G03b *23/00*
U.S. Cl. 353—103 14 Claims

ABSTRACT OF THE DISCLOSURE

A wireless remote control system is provided for selectively actuating a forward and reverse changing mechanism of a projector such as a slide projector. This system includes a hand-held control unit which develops a pulse length modulated beam of actinic radiation for energizing a photosensitive receiver mounted upon the slide projector. The beam of light is chopped through the use of an alternately opaque and transparent rotating or vibrating grate.

BACKGROUND OF THE INVENTION

Field of the invention

This invention relates to apparatus for providing selective signals to control different operations within a receiving device which apparatus is remote from the receiving device. More particularly, the invention relates to apparatus for providing a wireless remote control the operation of a slide changing mechanism of a projector, such as a movie or slide projector.

Description of the prior art

The remote control arts have evolved a wide diversity of approaches for selectively energizing remotely situate controlled devices and systems. More recently, industrial interest has been evidenced particularly in the evolution of remote controls adopted for use with a wide variety of consumer products such as television receivers and the like.

Generally, these consumer product control systems have been designed using one of three technical approaches for signal transmission: acoustic, a simplified R.F. signaling arrangement, and light impulse, incorporating the detection characteristics of a photocell. The use of the acoustic signal transmission has remained somewhat predominant.

Within the household products field, remote control utilizing radio wave transmission systems has not been favored as a consequence of its relatively higher cost for transmission and reception over the short ranges involved as well as its more or less undesirable interference characteristics.

The control signal technique of using a beam of light or light impulse within a combination including a photocell detection scheme, similarly, has not gained wide consumer acceptance for a number of reasons. For instance, the photosensitive device employed at the pick-up or receiving stations of such systems have heretofore been segregated within individual control circuits or channels. This requisite segregation of the photocells within mutually exclusive channels stems from the difficulties of modulating a light beam in a manner rendering it capable of transmitting more than a singular quantum of information. As a result, in applications wherein more than a single signal is transmitted, a multitude of receiving channels must be established, thereby engendering undesirable complexity and necessarily higher production costs. Light impulse transmission systems are also subject to false actuation or triggering due to adverse ambient lighting conditions. Under design parameters requiring a number of photocell channels, the problems of blocking spurious light inputs may add to circuit complexity.

The more predominant acoustic control systems are designed for transmitting information within both the audible and ultrasonic ranges to a singular pick-up station. By varying frequencies of the projected signal, a select series of control functions can be introduced at the receiving device. Of course, both the transmitting implements and more particularly the receiving circuitry become somewhat complex as signal discriminating circuitry and variable tone implements are introduced into the system. The available range of tarnsmission of these devices is also subject to degree of limitation, inasmuch as the amplitude of the signal received at the pick-up station of the system varies inversely as the square of the distance between that station and the point of transmission. Similar to the afore-described light impulse systems, the acoustic receiving circuitry is, without appropriate blocking and the like, subject to false triggering from extraneous acoustic signals.

Looking more specifically to the art for controlling slide projectors, wireless remote control devices have not been extensively introduced by the industry as a result of the marginal production economies realized with conventional systems. To be economically practical the costs of the devices must be such as to conform with the pricing of the slide projector market. Further, concerning product design, the pick-up station or receiving unit of the remote control system should be characterized in having a low bulk so as not to detract from the requisite portability of the projector.

The above two marketing requirements for low cost and low bulk necessitate a non-complex but reliable control unit. As an additional design requirement, the control system should be capable of facile incorporation within the slide changing mechanisms of current projector production models. Inasmuch as these electro-mechanical changing mechanisms are of a somewhat complex nature, they are not readily amenable to a re-design accommodating a new control unit. As a result, the complexities inherent in present changing systems have hindered the introduction of a wireless remote control approach.

For the purpose of providing a wireless slide changing control for projectors, the earlier described acoustic transmissions approach has been found too complex and bulky. Similarly, light impulse systems heretofore have failed to meet the criteria for simplicity as a result of their need for a multichannel pick-up arrangement. The short transmission ranges necessitated for the control of slide projectors renders radio frequency transmission impractical. Further, a wireless remote control system has not been introduced which, while enjoying a simple design, is readily substituted for the forward and reverse switch of a slide projector.

SUMMARY OF THE INVENTION

The invention now presented offers solution to the problems and deficiencies outlined above by providing, inter alia, a wireless remotely actuated switching mechanism and system which utilizes an actinic radiation impulse arrangement for developing multiple modes of switching. The technique of the invention is characterized in the use of a chopped actinic radiation beam of preselected duration which delivers a distinctly timed signal into a photosensitive pick-up station. As used herein, the term "actinic radiation" includes any part or all of the electromagnetic spectrum between and including ultraviolet and infrared.

The invention is particularly characterized by the incorporation with a projector such as a slide projector of a single channel photosensitive receiving station which will provide a forward or reverse slide changing mode upon reception of a pulse length modulated signal. The invention comprehends the use of a remotely situate light impulse control unit incorporating an alternately opaque and transparent grate to evolve a chopped signal light beam. Through the use of the chopped signal, the light impulse control arrangement of the invention is immune to false triggering resulting from spurious ambient illumination.

A remote control switching system of the light impulse variety is provided for use with a slide changing mechanism of the type having forward and reverse switching modes sensitive to the duration of its input switching signal.

The invention further comprehends a hand held remote control unit having a battery powered source of actinic radiation which may be of relatively high intensity. The light source is disposed within the unit so as to provide a chopped beam of light which is energized for a selected duration through the use of timed switching or shutter means. Chopping of the light signal may be provided by a rotatable or vibratory grate disposed within the control unit in front of the light source.

The pick-up station of the invention is of advantageously simple design and capable of fabrication in adequately small dimension. As an additional object, the pick-up station of the invention incorporates a singular photocell responsive to the light impulse signal of the control unit, an A.C. amplification, a filtration and a rectification of the signal developed within the photocell so as to introduce a correspondingly discretely timed switching signal into the forward-reverse switching mechanism of a slide projector.

By virtue of the availability of its operation with only a single photocell, the pick-up station of the control system is fabricable with a small number of components, thereby being amenable to simple and economically practical production procedures. Additionally, the remote control system of the invention may be readily incorporated within certain slide projectors extant in commerce by facile attachment with the switching function of their slide changing mechanisms. As a consequence of its small size, the pick-up station of the inventive control unit is readily attached to a conventional slide projector without detracting from its requisite portability and compactness.

The above novel features of the invention will become apparent from the following detailed description and drawings.

DESCRIPTION OF THE PREFERRED EMBODIMENTS

Figures 1, 2, 3:
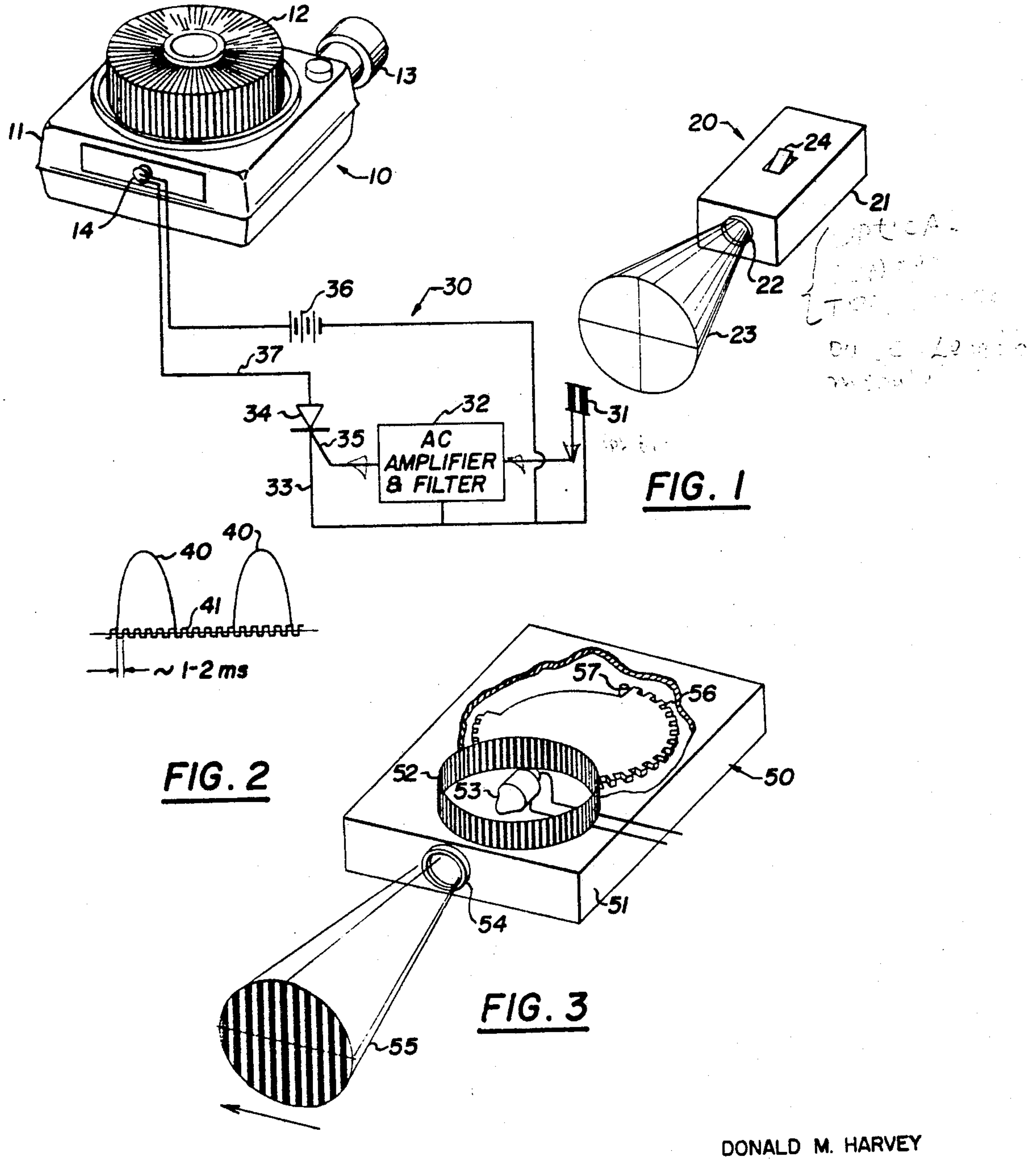
FIG. 1 is a pictorial representation of a slide projector incorporating the remote control system of the invention with portions of the pick-up station circuitry shown schematically.
FIG. 2 is a wave shape diagram representing the wave form developed by the pick-up station circuitry of FIG. 1.
FIG. 3 is a perspective representation of a remote control unit fabricated according to the invention having portions cut away to reveal internal structure.

In FIG. 1, a slide projector 10 is shown having a body portion 11 upon which is supported an annular rotatable slide magazine 12. During its operation, slides are selectively moved into position within the body of the projector for projection via an adjustable lens 13 onto an appropriate reflecting surface. In accordance with the invention, the slide switching mechanism of the projector 10 is remotely actuated by the energization of the hand held remote control unit 20. Control unit 20 comprises a lightweight housing 21 having a lense 22 through which is projected a cone of pulse-length-modulated actinic radiation or radiant energy, such as light impulse beam 23. The light impulse beam 23 is generated by suitably manipulating a switch such as switch 24 and the forward or reverse switching modes of the projector 10 are energized as radiation from cone 23 impinges upon a pick-up station mounted upon the projector housing 11. A pick-up station 30 is depicted for illustrative purposes only as interconnected with the slide changing circuitry of the projector 10 at a terminal 14. It will be understood by those familiar with the art that the station 30 may be mounted at any location, on, within or near the housing 11, which is accessible to the radiation 23 emanating through lens 22.

In operating the remote control system, the operator points the control unit 20 in the general direction of pick-up station 30 and, having selected a forward or reverse slide changing mode, actuates switch 24 to generate a light impulse signal. Pick-up station 30 will then introduce a corresponding signal of appropriate duration into the changing mechanism of projector 10.

Exemplary of the slide changing mechanism which will be found suitable for use with the instant remote control system is that described in United States Patent No. 3,236,113 by H. T. Robinson and M. DiPietro entitled "Slide Tray Indexing Mechanism and Control Therefor" and having the same assignee as the present invention. By deactivating the forward slide changing switch and introducing the signal generated through pick-up station 30 into the reversing switch terminals of the changing mechanism of the above patent, either a forward or a reverse slide changing mode may be effected. This dual mode performance is realized by the relatively simple expedient of limiting the input signal length to less than about one-third of a second where a forward changing mode is desired. A lengthier input signal will permit the reverse changing mode circuitry to operate in conventional fashion.

Looking at the circuitry of pick-up station 30, the forward or reversing signal from control unit 20 will impinge upon a photoelectric cell 31. This signal, depicted by cone 23 is chopped to a frequency which may be in the order of 1000 c.p.s. and is pulse length modulated to effect the desired switching mode. The chopping frequency may be established at any of a wide variety of practical figures, the function of the chopping being to afford facile high pass filtering discrimination over ambient or spurious illumination which will generally be near 120 c.p.s.

Upon reception at photocell 31, the chopped, pulse length modulated light impulse signal 23 is converted into a corresponding electric signal by A.C. amplifier and filter 32 prior to transmission through wire 33 to a silicon controlled rectifier 34. A blocking of spurious D.C. and very low frequency signals will also be provided by virtue of the A.C. amplification. The rectifier 34 is fired through gate 35 in accord with the preselected chopping frequency. A D.C. power supply 10 is provided for use with the aforedescribed circuitry. It will be understood that other D.C. sources emanating from the circuitry of the projector 10 may be tapped for service as the instant power supply.

Turning to FIG. 2, a schematic wave shape diagram showing the half-wave rectification developed at silicon controlled rectifier 34 is provided in further illustration. As discussed above, the chopping frequency is selected having a relatively high value for filtering purposes. This higher frequency also assures the firing of the silicon controlled rectifier at gate 35 at least once at or near the beginning of each positive half-cycle of the switching pulse shown at 40. The gate frequency wave firing pulses are indicated on diagram 41. For a changing signal pulse of one-fourth second, a firing interval of about one or two milliseconds will be found adequate to achieve a desired threshold firing.

The control unit 20 of this invention must be capable of generating a suitably chopped, pulse length modulated signal for use with the pick-up station 30 while remaining simple in construction and economically fabricated. Two embodiments for the control unit are described in connection with FIGS. 3–6. Each of the designs utilizes a movable grating disposed before a light source to develop a requisite chopped light beam. The beam may be projected through a lens of relatively short focal length so as to provide for greater depth of field and facile aiming of the control unit 20. Additionally, optical filters may be incorporated with the light beam developing structure of either embodiment for the purpose of removing most or, if desired, all of the visible portion of the light spectrum. The resultant invisible signal will serve to eliminate any distraction otherwise encountered by a projected-slide-viewing audience.

Figure 4:
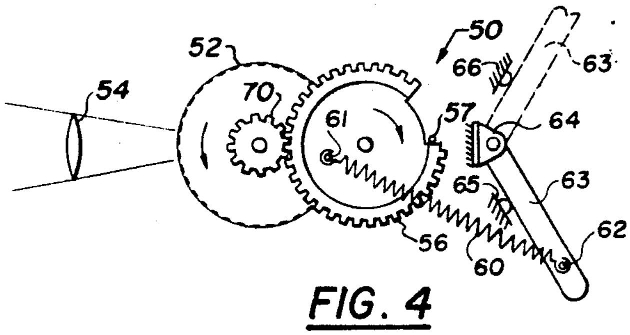
FIG. 4 is a schematic representation of the grate driving mechanism for the control unit of FIG. 3.
Figure 5:
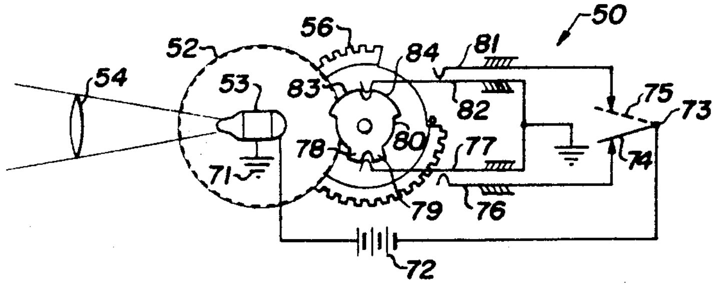
FIG. 5 is a schematic representation of a signal timing mechanism for the device of FIG. 3.

One embodiment of a control unit is depicted in connection with FIGS. 3, 4 and 5. In FIG. 3, a control unit 50 is shown having a housing 51 within which a grate 52 having a cylindrical shape is rotatably mounted. Within the open central portion of the grate 52 a light source 53 is mounted so as to project a beam of light through grate 52 and lens 54, thereby developing a chopped light beam 55.

The annular grate 52 is caused to rotate by virtue of its interconnection with a spring driven gear 56. Gear 56 is rotatable in clockwise or countercolckwise direction through a sector defined by the travel-limiting post 57. The extent of travel of the gear 56 is selected so as to accommodate the time span of the longest switching mode signal broadcast by the control device. Grate 52 may be fabricated from a transparent material such as a plastic or the like. The grate is fashioned having a series of spaced parallel opaque lines printed or suitably formed upon its surface so as to evolve the alternately opaque and transparent light beam 55. Any of a broad range of chopping frequencies may be designed into the mechanism by the simple expedient of preselecting the number of opaque lines printed upon the grate per unit of circumferential length.

The driving mechanism for grate 52 is portrayed in more detail in FIG. 4. Gear 56 is shown driven by a helical spring 60 which is suspended in tension between a post 61 attached to the gear and a second post 62 attached to a toggle arm or lever 63. Arm 63 is pivotally attached to a fulcrum 64 which in turn is fixed to the housing of the control unit. Upon hand manipulation of lever 63 from its biased position against abutment 65 over to the oppositely disposed abutment 66, as shown in phantom, the gear 56 will be caused to rotate to its alternate position against post 57.

Rotation of sectored gear 56 will, in turn, cause rotation of pinion 70. Pinion 70, enmeshed with the teeth of gear 56, is axially attached to the cylindrical grate 52 and serves to drive it for the production of the chopped signal. It will be apparent that the direction of rotation of mate chopped light beam signal issuing from the control gear 56 and pinion 70 will have no effect upon the ulti- unit.

For the control unit embodiment thus far described, light beam pulses may be selectively timed through the use of a cam actuated switching arrangement in connection with light source 53. Referring to FIG. 5, light source 53 is shown connected between a ground 71 and battery power source 72. The light 53 is energized for either a forward slide changing mode or a reverse slide changing mode by moving a switch 73 respectively to its circuit closing contact at 74 or to contact 75, the latter position being illustrated in phantom. To develop forward mode timing (for instance, one-fourth of a second) switch 73 is closed upon contact 74. Contact 74 is in conducting attachment with a spring contact 76 which is, in turn, positioned for circuit closing contact with a cam follower 77. Cam follower 77, fixed and grounded to the control unit housing, is shown riding upon a cam 80. Cam 80, axially aligned and fixed to gear 56, is fabricated in a manner providing for the closure of contacts 76 and 77 for the short pulse duration, as by cam follower 77 riding over raised portion or surface 78 or 79 of cam 80, to cause a forward slide changing mode.

In similar fashion the manipulation of switch 73 to contact position 75 will arm the light beam circuitry for a reverse slide changing mode. Rotation of spring driven gear 56 and connected cam 80 will cause the closing of spring contact 81 with cam follower 82, as by cam follower 82 riding over raised portion or surface 83 or 84, for a time interval sufficient to create a light beam pulse developing a reverse slide changing mode. A one-half second interval is typically selected for the reverse switching interval. Through the use of a toggle lever 63 and helical spring 60 arrangement, there is imparted to the grate 52 a rotational speed of substantial consistency. Thus, there is assured a uniformly chopped and pulse-length-modulated signal for introduction to the pick-up station 30 of FIG. 1.

The above-described control unit mechanism and circuitry is seen to evolve the requisite switching function with a minimum of operator activity. Upon the selection of either a forward or reverse slide changing mode by positioning switch 73, the operator merely flicks the toggle lever 63 to its opposite position. The mechanism will then perform its appropriate function.

Figure 6:
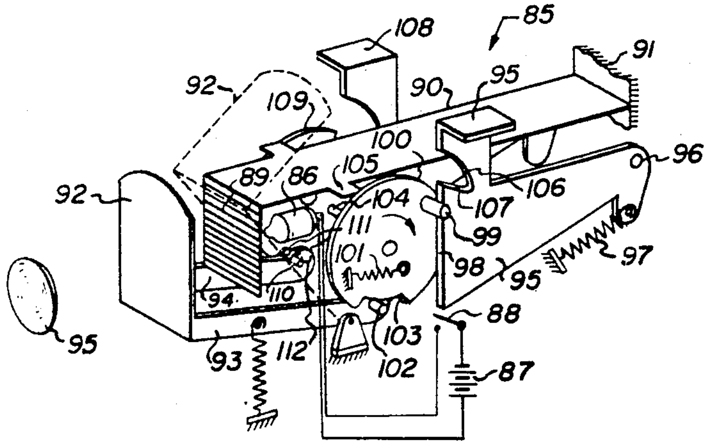
FIG. 6 is a perspective and partially schematic view of an alternate embodiment of the control unit of the invention.

Another embodiment for a control unit is illustrated in FIG. 6, wherein a hand-held control unit 85 incorporates means for producing actinic radiation or radiant energy, such as light source 86 powered by a battery unit 87 within a simple series circuit including a normally open switch 88. As in the earlier described embodiment, the present arrangement positions the light source behind a movable grate 89 attached to a vibratory reed 90 extending from a base 91 attached to the control unit housing (not shown). Similar to cylindrical grating 52 of FIGS. 3–5, grating 89 may be fashioned having alternately transparent and opaque stripes printed upon a suitable transparent plastic material. Of course, numerous techniques for fabricating the grating will occur to those versed in the art.

Upon passing through the grating 89, the light beam generated from light source 81 will impinge upon a two-speed rotatable shutter 92 mounted at the end of spaced actuator arms 93 and 94 which are pivotally mounted, as shown. Shutter 92 serves to provide pulse length modulation for effecting the relatively short pulse forward slide changing mode or the longer pulse reverse slide changing mode. Similar to the earlier embodiment, the beam of light issues from the control unit through a lens 95 which may be attached to the outer frontal surface of the control unit, will preferably be dimensioned having a relatively short focal length of about one-half inch so as to provide adequate depth of field.

The use of a vibratory reed arrangement 90 affords an advantageously broad range of chopping frequencies above those available through the use of the earlier described rotating cylinder approach. These frequency ranges are availed through appropriate selection of reed materials along with design dimensioning of the cantilever structure.

A common shutter release may be utilized for the multiple purposes of closing switch 88, mechanically exciting the reed 90 and actuating the shutter 92. For the reverse mode of operation, a reverse operating lever 95 may be depressed. This lever is pivoted about pin 96 and is normally held in raised position by spring 97. Upon depression of lever 95, forward edge 98 thereof will frictionally slide past pin 99 on rotatable cam 100.

After the upper end of edge 98 passes pin 99, cam 100 will be free to rotate in a clockwise direction, as viewed in FIG. 6, under the influence of spring 101 causing pin 102 on shutter arm 93 to ride out of recess 103 onto the peripheral edge of cam 100 so that shutter 92 is raised to the dotted line positioned allowing the beam from light 86 to pass through lens 95. During this movement, the end of lever 95 will also engage and close switch 88 to energize the light. As cam 100 is rotated, a pin 104 thereon will engage an ear 105 on reed 90 to excite the latter. By properly arranging the parts, light 86 will be energized and reed 90 will be excited before shutter 92 is raised. The shutter will be held in the raised position for a relatively long period of time, say one-half second or more. As cam 100 continues to rotate, pin 99 will ride into recess 106 on operating lever 95. Upon release of lever 95, it will be returned to its raised position by spring 97, which is stronger than spring 101. This upward movement will cause cam 100 to be rotated in the opposite direction as pin 99 rides along the cam surface 107 of recess 106, thereby recocking the mechanism.

For the forward mode of operation a similar mechanism is provided on the opposite side of reed 90. Thus, upon depressing a forward operating lever 108 a cam 109 will be rotated causing a pin 110 on shutter 94 to ride out of recess 111 onto raised peripheral edge portion 112. However, for the forward mode the shutter should be raised for a relatively short period of time, say one-fourth second. Therefore, raised portion 111 has a short length so that pin 110 rides down onto the main portion of cam 109 as the latter continues to rotate. Thus, it can be seen that one operating means, namely lever 95 or lever 108, may be actuated to initiate three distinct operations: energization of the light, excitation of the grate, and opening and closing of the shutter.

Where desired, additional features may be incorporated within the basic design approach of the control unit. For instance, the intensity of the light source may be increased through the use of a capacitance discharge. While conventional choppers may be incorporated with the control units, the above-described grating approaches wil be observed to offer considerable advantage inasmuch as lower amplitudes are available, i.e., they may be as low as the pitch of the grating. Further, where the vibratory reed approach is utilized, the frequency may be relatively low provided its amplitude or length of travel remains several times larger than the pitch of the grating. The term "pitch" as used herein is the dimension between adjacent corresponding points on the grating.

It will be apparent to those skilled in the remote control arts that this invention may find utility in the control of any device requiring at least a dual mode remote operation, but has been described and illustrated with respect to a slide projector for convenience. For example, the invention may find utility with movie projectors, television receivers, stereo sets and the like.

The invention has been described in detail with particular reference to the preferred embodiment thereof, but it will be understood that variations and modifications can be effected within the spirit and scope of the invention as described hereinabove.

I claim:

1. A remote control unit, for operating a device having two operation modes, comprising:
- actinic radiation means for producing a beam of radiant energy;
- a movable chopper positioned for movement to modulate the energy of said beam; and
- timer means associated with said actinic radiation means for effecting selective pulse-length modulation of said beam to selectively initiate said operation modes.

2. A remote control unit, as set forth in claim 1, wherein said chopper includes:
- a radiant energy transmitting area for passage of said radiant energy therethrough; and
- a radiant energy inhibiting area for blocking passage of said radiant energy therethrough.

3. A remote control unit, as set forth in claim 2, further including:
- a plurality of said areas alternatingly disposed on said chopper to define a regularly spaced pattern for providing corresponding regularly-timed interruption of said radiant energy passing through said chopper upon movement thereof.

4. A remote control unit, for operating a device having two operation modes, comprising:
- actinic radiation means for producing a beam of radiant energy;
- timer means coupled to said actinic radiation means for effecting selective pulse-length modulation of said beam to selectively initiate said operation modes;
- an annular chopper rotatably mounted within said control unit, said chopper having a plurality of alternatingly-disposed radiant-energy transmitting and blocking areas to provide corresponding regularly-timed interruption of said radiant energy through said chopper upon rotation thereof; and
- drive means coupled to said chopper for rotation thereof.

5. A remote control unit, as set forth in claim 4, wherein said drive means comprises:
- a pivotally-mounted lever;
- rotatable gear means mounted for rotation through a preselected sector and coupled to said chopper so that said chopper is rotated upon rotation of said gear means; and
- resilient means interconnecting said lever means and said gear means to cause rotation of said gear means and said chopper upon the actuation of said lever means.

6. A remote control unit, as set forth in claim 4, wherein said timer means comprises:
- a rotatable cam having two peripheral portions of different length;
- first and second cam-follower switching means respectively connected in circuit with said actinic radiation means and each adapted to be closed upon engagement, respectively, with one of said peripheral portions to provide two selective intervals of energization of said actinic radiation means; and
- movable switching means electrically coupled in a circuit wtih said first and second cam follower switching means for selectively completing the circuit with one of said cam-follower switching means to select the duration of energization of said actinic radiation means.

7. A remote control unit, as set forth in claim 6, wherein:
- said cam is rotatably coupled and actuated by said drive means.

8. A remote control unit, as set forth in claim 4 wherein:
- said annular chopper is cylindrical and is mounted concentrically with said actinic radiation means.

9. A remote control unit, for operating a device having two operation modes, comprising:
- actinic radiation means for producing a beam of radiant energy;
- an actuatable shutter for effecting selective pulse-length modulation of said beam to selectively initiate said operation modes;
- a generally planar grate, mounted for reciprocative vibratory movement, having a plurality of alternatingly-disposed radiant-energy transmitting and blocking areas to provide corresponding regularly-timed interruption of said radiant energy through said grate upon vibration thereof; and
- a single control means for energizing said radiation means, actuating said shutter and vibrating said grate in timed relation.

10. A remote control unit, as set forth in claim 9, wherein said control means includes:

a rotatable member adapted to actuate said shutter and vibrate said grate upon rotation thereof, and actuating means coupled to said rotatable member and said radiation means for rotating said member and energizing said radiation means.

11. A remote control unit, as set forth in claim 9, wherein said control means includes:

a first mechanism coupled to said shutter to effect a pulse-length modulation to initiate one of said operation modes; and a second mechanism coupled to said shutter to effect a pulse-length modulation to initiate the other of said operation modes.

12. A remote control unit, for operating a device having two operation modes, comprising:

actinic radiation means connected in a circuit for producing a beam of radiant energy;

an actuable shutter, movable from a beam blocking position and a beam transmitting position, for effecting selective pulse-length modulation of said beam to selectively initiate said operation modes;

a generally planar grate, mounted for reciprocative vibratory movement, having a plurality of alternatingly-disposed radiant-energy transmitting and blocking areas to provide corresponding regularly-timed interruption of said radiant energy through said grate upon vibration thereof;

a rotatable cam coupled to said shutter and having engageable means for vibrating said grate upon rotation of said cam;

an actuator movable between a first and second position, movement of said actuator from said first position to said second position completing said circuit to energize said radiation means and causng rotation of said cam means so that said shutter is actuated and said grate is vibrated.

13. A remote control unit, as set forth in claim 12 wherein said shutter is attached to one end of a pivotally mounted arm and a cam engaging pin is attached to the opposite end, said cam further including:

a recess engageable with said pin when said actuator is in said first position;

actuator engaging means on said cam, engageable by said actuator upon movement of said actuator from said first position to said second position to rotate said cam and move said pin out of said recess so that said shutter is pivoted to a beam transmitting position; and resilient means connected to and tending to rotate said cam in the same direction as said actuator rotates said cam, said pin preventing rotation until said pin is moved out of said recess upon movement of said actuator from said first position to said second position.

14. Photographic apparatus, for the projection of images from slide transparency units, comprising:

a photographic slide projector having switching means and transparency unit changing means operable in forward and reverse modes upon energization of said switching means by means of a beam of radiant energy for selective time intervals corresponding to the mode selected; and a remote control unit for operating said switching means, having actinic radiation means for producing said beam of radiant energy; a movable chopper positioned for movement to modulate the energy of said beam; and timer means associated with said actinic radiation means for effecting selective pulse-length modulation of said beam to selectively initiate said forward and reverse modes.

References Cited

UNITED STATES PATENTS

| | | | |
|---|---|---|---|
| 2,457,502 | 12/1948 | Shepherd | 250—199 |
| 3,199,005 | 8/1965 | Ashworth | 318—16 |
| 3,236,113 | 2/1966 | Robinson et al. | 353—106 |

SAMUEL S. MATTHEWS, Primary Examiner

U.S. Cl. X.R.

250—199; 307—117; 340—167